Dec. 18, 1962 W. N. POUNDSTONE 3,068,995
TROUGHING IDLER FOR CONVEYOR BELTS
Filed Oct. 13, 1959
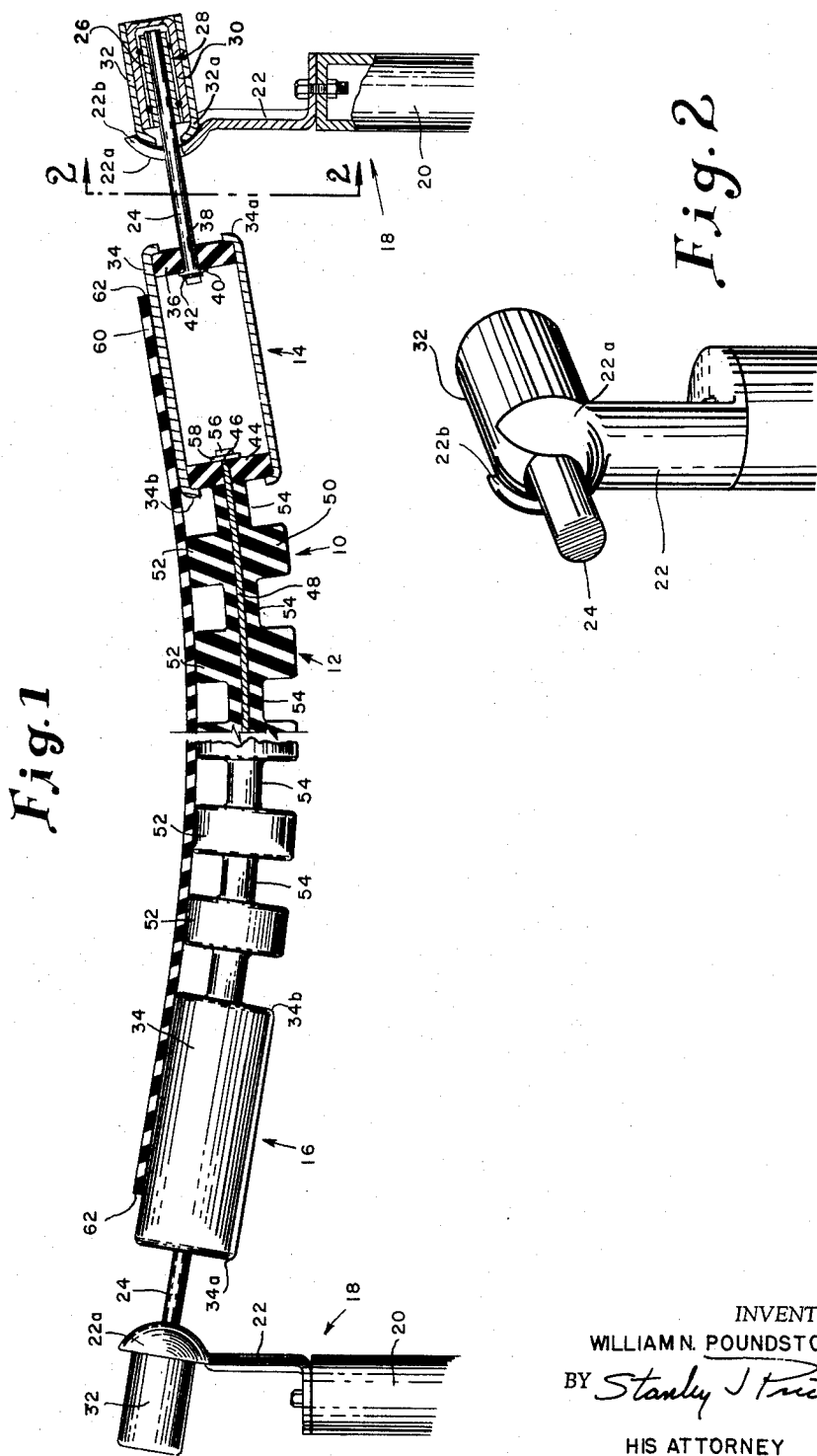
INVENTOR.
WILLIAM N. POUNDSTONE
BY Stanley J Price
HIS ATTORNEY

United States Patent Office 3,068,995
Patented Dec. 18, 1962

3,068,995
TROUGHING IDLER FOR CONVEYOR BELTS
William N. Poundstone, Morgantown, W. Va., assignor to Consolidation Coal Company, Pittsburgh, Pa., a corporation of Pennsylvania
Filed Oct. 13, 1959, Ser. No. 846,089
6 Claims. (Cl. 198—192)

This invention relates to troughing idler rollers utilized to support the troughed conveying reach of an endless conveyor belt, and more particularly to an improved idler roller which has a flexible portion and a rigid portion to provide for most efficient belt support and long belt and roller life The conventional endless belt conveyor consists of a belt supported by a series of idler rollers. The belt is driven by a belt drive means. The belt has a troughed conveying reach supported in a generally horizontal manner by a series of troughing idler rollers. The conveying reach carries the material to be transported by the conveyor belt. The conveyor belt has a return reach supported in a generally horizontal manner, usually below the conveying reach, by a series of return reach idler rollers. The return reach returns the empty portion of the belt to the belt drive to form a continuous path for the endless conveyor belt.

The present invention is concerned with providing an improved roller assembly for supporting the troughed conveying reach of an endless belt. Troughing idler rollers are presently known in which the idler rollers have flexible roller shafts formed of wire rope or the like. These flexible shaft rollers are designed to hang in a catenary between fixed supports disposed at either end of the shaft. There are definite advantages to this known type of flexible shaft roller. The flexible shaft of the roller allows the trough on the belt conveying reach to adjust itself for the various load conditions. When the belt is heavily loaded, the conveying reach trough deepens thus changing the shape of the catenary in which the flexible shaft hangs. When the load on the belt is lighter, the trough of the conveying reach becomes more shallow. While the overall length of the roller shaft does not change appreciably, the shape of the catenary, and accordingly the shape of the trough of the conveying reach, can change because of the flexible characteristics of the roller shaft.

In the flexible shaft type of troughing idler rollers, the roller members are nonrotatably secured to the flexible shaft and the shaft and the rollers rotate as a unit between bearings that support the shaft at each of its ends. This construction provides advantages in that only two bearings are required to support the ends of the shafts. If the roller members rotated relative to the flexible shaft, a pair of bearings would be required for each roller unit thereby increasing both the weight and the cost of the assembly. Although several advantages, some of which have been enumerated in the foregoing paragraphs, result from the use of a known flexible shaft idler roller, one serious disadvantage is associated with this type of roller. When a flexible shaft type of roller is utilized and the conveying reach of the endless belt conveyor is lightly loaded, the inherent stiffness of the conveyor belt tends to flatten the trough of the conveyor belt conveying reach. Under these light loading conditions, the catenary curve in which the flexible shaft of the roller normally tends to hang, is flattened at the center. This flattening at the center of the belt causes relatively sharp bends or crimps to develop in the flexible roller at the points at which the edges of the belt contact the rollers. Thus, instead of the flexible shaft of the roller assembly hanging in a smooth catenary curve, it has sharp bends or crimps where the edges of the belt contact the rollers.

Since the rollers and flexible shaft of the standard flexible shaft rollers rotate as a unit, the sharp bends at the edges of the belt must reverse themselves at each revolution of the roller. Thus, the stresses created in the flexible shaft by the sharp bend condition at the edges of the belt are magnified by the rotation of the roller shaft. It has been found that the standard flexible shaft rollers often fail at the points at which the edges of the belt contact the roller assembly. This is attributed to the fatigue of the flexible member which flexes under stress at each revolution of the roller under light loading conditions of the conveyor belt troughed conveying reach.

The present invention contemplates the provision of a roller assembly which retains all the advantages of the flexible shaft roller assembly described above and which overcomes the serious disadvantage of breakage of the flexible shaft at the points where the edges of the belt contact the roller. The roller assembly of the present invention has two rigid end rollers positioned at the points where the belt edges contact the roller assembly. However, the roller of the present invention still hangs in a catenary between two end supports so that all the desirable features of the flexible shaft roller assembly are retained. The roller of the present invention has a further improvement in that it is provided with resilient connections between the flexible member and the rigid end rollers and between the rigid end rollers and the supporting means.

The strategically positioned resilient connecting members provide for resilient support of the belt which increases belt life and also decreases bearing failures due to shock loads being transmitted to the bearings. Because of the resilient connections between the portions of the roller assembly which actually support the belt and the portions of the assembly which are supported by the bearings, any shocks which might result from heavy material falling upon the belt are insulated from the bearings. Further, the resilient connecting means also allows slight elongation of the roller assembly shaft under severe belt loading conditions. This elongation of the roller assembly shaft reduces the possibility of shaft breakage under heavy load on the troughing idler due to a heavily loaded belt conveying reach. Nevertheless, the resiliency of the connecting members allows the roller shaft to return to its normal size when the overload is removed.

With the foregoing considerations in mind, it is a principal object of the present invention to provide an improved flexible shaft type idler roller assembly that has improved operating characteristics in that bending stresses in the flexible shaft at the points where the edges of the conveyor belt contact the roller are minimized.

It is another object of the present invention to provide an idler roller assembly that has rigid roller portions at the points where the edges of the conveyor belt contact the roller under all conditions of belt loading.

It is another object of the present invention to provide a roller assembly with rigid portions and flexible portions that hangs in a catenary curve between two support members.

It is still another object of the present invention to provide an improved troughing idler roller assembly with resilient means as a part of the idler roller that absorbs the shock of uneven loads on the idler roller, to thereby increase bearing and conveyor belt life.

These and other objects and advantages of the present invention will become apparent as this description proceeds in conjunction with the attached drawings.

In the drawings:

FIGURE 1 is a partial longitudinal section of the improved idler roller assembly of the present invention showing details of construction of the idler roller and support means.

FIGURE 2 is a partial section taken along line 2—2 of FIGURE 1 showing a portion of the roller support means.

Referring now to the drawings in which like reference numerals refer to similar elements in both figures, the present invention will be described in some detail. The improved idler roller assembly 10 comprises generally the center suspension member 12, the rigid end roller assemblies 14 and 16, and the roller support means 18. The roller support means 18 consists of a pair of vertical standards 20 having brackets 22 secured to the upper portions thereof. As is best seen in FIGURE 2, the brackets 22 have spherical upper portions 22a with a slot 22b formed therein. The spherical portion 22a of bracket 22 provides an internal spherical surface to the bracket for a purpose which will become apparent as its description proceeds. A pair of stub shafts 24 are associated with the brackets 22. The stub shafts have the inner races 26 of the bearing assemblies 28 nonrotatably secured to their ends in any suitable manner such as by a press fit or the like. The outer races 30 of the bearing assemblies 28 are nonrotatably secured to a cup member 32. The cup member 32 has a spherical external end surface 32a surrounding the stub shafts 24 which passes therethrough.

The rigid end roller assemblies 14 and 16 are identical in construction and for that reason like reference numbers have been applied to the component parts of the assemblies. The following description of the rigid end roller assemblies is equally applicable to either of the end roller assemblies 14 or 16; however, since roller assembly 14 is shown in section, the description will refer specifically to that assembly. The end rollers are formed from rigid tubes 34 which may be a light metal such as aluminum. At the outboard or shaft end of the tube 34 a resilient end wall 36 is secured within the tube 34. Resilient end wall 36 is formed of rubber, neoprene, or the like, and provides a resilient support for the tube 34. The external circumferential dimension of the end wall 36 is slightly larger than the internal dimension of tube 34 so that the end wall 36 fits with a slight interference fit into the tube 34. The end of the tube 34 is then rolled as indicated at 34a to axially retain the end wall 36 within tube 34. The resilient end wall 36 has a center bore 38 which is coaxial with the tube 34. The diameter of bore 38 is slightly smaller than the diameter of stub shaft 24 so that stub shaft 24 passes through bore 38 with a slight interference fit and is nonrotatably secured to the resilient end wall 36. A back-up washer 40 and snap ring 42 maintain the ends of the stub shafts 24 within the bores 38.

At the inboard or suspension ends of tubes 34, resilient end walls 44 are secured in tubes 34. End wall 44 is generally similar to end wall 36 and is axially maintained within tube 34 by rolling the ends of the tubes as indicated at 34b. Center bore 46 in end wall 44 is coaxial with the tube 34 and is of such size that the flexible member 48 passes through bore 46 and nonrotatably is secured to the end walls 44.

The suspension member 12 is formed from a center flexible member 48 surrounded by a resilient sheath 50. Flexible member 48 may be formed from a wire rope cable, a chain, or any other flexible material having sufficient tensile strength. The flexible member 48 is illustrated as a wire rope cable in FIGURE 1. The sheath 50 is formed of rubber, neoprene, or any similar resilient material. The sheath 50 has an annular cross section and is formed with an irregular external surface so that the external surface forms belt contacting portions 52 and spacer portions 54 which has a diameter less than the diameter of the belt contacting portions 52.

The belt contacting portions 52 have a relatively short longitudinal dimension and have an external diameter substantially equal to the external diameter of tubes 34. The spacer portions 54 maintain the belt contacting portions 52 spaced along the flexible member 48. Sheath 50 is nonrotatably secured to the flexible member 48 as by molding the sheath 50 around the member 48. It will be appreciated that a series of individual belt contacting portions 52 could be secured to the member 48 to create an equivalent structure. The present invention is concerned with providing a flexible member 48 with series of belt contacting portions 52 nonrotatably secured thereto.

The ends of the flexible cable 48 pass through the bores 46 in the end walls 44 secured to the respective tubes 34. Cap members 56 are secured to the end of wire rope cable 48 in such a manner that they cannot be detached by an axial force within the tensile strength of the cable 48. A pair of back-up washers 58 are placed between caps 56 and end walls 44. In some instances it may be desirable to mold the end walls 44 of the roller assemblies 14 and 16 onto sheath 50 as a unit therewith.

With the foregoing elements of the present invention in mind, the novel features resulting from the assembly of these elements will become readily apparent. The stub shafts 24 are rotatably supported within cup members 32 by bearing assemblies 28. The cup members 32, in turn, are supported by brackets 22 which have spherical internal surfaces formed adjacent their upper end portions. The spherical internal surfaces of brackets 22 cooperate with the spherical external end surface 32a on the cup member 32. The stub shaft 24 extends through slot 22b to thereby permit the positioning of member 32 in bracket 22. With this arrangement, the stub shaft 24 rotates about its own axis within the cup member 32, and at the same time cup member 32 is universally supported by the bracket 22 for movement along the cooperating spherical surfaces. The stub shafts 24 are non-rotatably connected to the tubes 34 through the resilient end walls 36. Thus, the rigid stub shafts 24 and the rigid tube members 34 are resiliently secured to each other. At the inboard ends 34b of tubes 34, the flexible member 48 is resiliently and non-rotatably secured to tubes 34 through the resilient end walls 44. It will be noted that the roller assembly consisting of the stub shafts, roller assemblies 14 and 16 and suspension member 12, hangs between the bearing assemblies 28 in a manner which approximates a catenary curve.

The idler roller assembly 10 supports the troughed conveying reach 60 of a conveyor belt having parallel edge portions 62. The edge portions 62 of the conveying reach 60 are supported by the rigid tubes 34 of the end rollers 16 and 14. The end roller assemblies 14 and 16 and the suspension member 12 are so proportioned, and the axial lengths of tubes 34 are such, that the edge portions 62 of the conveying reach 60 are supported by tubes 34 under all conditions of belt loading. Thus, under heavy loading conditions of the conveying reach, the edges of the belt will move inwardly toward the center of the idler roller and toward ends 34b of tubes 34. Under more lightly loaded belt conditions, the edge portions 62 will move outwardly toward ends 34a of tubes 34.

The mating spherical surfaces on bracket 22 and cup member 32 allow the ends of the stub shafts to float so that the shape of the catenary which the roller assembly 10 assumes may be adjusted under various belt loading conditions. Since, on a common catenary curve, the portions near the supports are relatively flat, the rigid stub shafts 24 and tubes 34 do not destroy the catenary effect of the roller assembly 10. Further, the universal action at brackets 22 allows the roller shaft to assume its proper position.

The resilient end walls 36 which non-rotatably secure tubes 34 to the stub shafts 24 resiliently insulate the belt supporting portions of the roller assembly from the bearing assemblies 28 which support the stub shafts. In the event that the roller assembly is subjected to shock loads due to pieces of material striking the belt, the bearings will be resiliently insulated from the shock since there is no non-yielding metal-to-metal connection between the cable 48 and the stub shafts 24. This same resilient insulating quality will extend belt life since the roller assembly will yield under shock loads which might otherwise cut or adversely affect the belt if it were passing over a rigid roller assembly.

Under extremely heavy loading conditions on the conveying reach 60, the resilient end walls 36 and 44 will allow the overall roller shaft axis to elongate slightly. Under very heavy loading conditions, the end walls 36 and 44 will become somewhat conical in shape; that is, their centers under the force exerted by back-up washers 40 and 58 will tend to be pulled outwardly from the tubes 34. This slight elongation of the roller axis, will prevent the breakage of the roller shaft under extreme conditions of belt loading. When the extreme load is removed, the resilient end walls 36 and 44 will resume their normal disc like configuration, and the length of the roller shaft will be returned to its normal condition.

It will be appreciated that because of the rigid tubes 34, there is no crimping or sharp bending of the flexible roller axis at the edges of the conveying reach 60. Thus, the undesirable flexing of the crimp edges of the earlier flexible shaft idler rollers is eliminated.

In accordance with the provisions of the patent statutes, I have explained the principle, preferred construction and mode of operation of my invention and have illustrated and described what I now consider to represent its best embodiment. However, I desire to have it understood that, within the scope of the appended claims, the invention may be practiced otherwise than as specifically illustrated and described.

I claim:

1. A conveyor belt troughing idler roller assembly comprising an elongated flexible member having first and second end portions and a plurality of axially spaced cylindrical belt contacting portions non-rotatably secured to said flexible member between said end portions, a first rigid cylindrical idler roller having a suspension end portion and a shaft end portion, a second rigid cylindrical idler roller having a suspension end portion and a shaft end portion, said flexible member first end portion non-rotatably secured to said first idler roller suspension end portion, said flexible member second end portion non-rotatably secured to said second idler roller suspension end portion, a first stub shaft non-rotatably secured to said first idler roller shaft end portion and extending outwardly therefrom, a second stub shaft non-rotatably secured to said second idler roller shaft end portion and extending outwardly therefrom, idler roller support means, first bearing means rotatably receiving said first stub shaft and supported by said support means, second bearing means rotatably receiving said second stub shaft and supported by said support means in spaced relation to said first bearing means, said first and second idler rollers and said elongated flexible member belt contacting portions supporting a conveyor belt troughed conveying reach having parallel side edge portions, said troughed conveying reach trough adapted to vary in depth under varying conditions of belt loading, said flexible member and said first and second idler rollers so constructed and arranged that said conveying reach edge portions remain in contact with said first and second rigid cylindrical idler rollers under all conditions of belt loading.

2. A conveyor belt troughing idler roller assembly comprising an elongated, flexible member having first and second end portions and a plurality of axially spaced belt contacting portions non-rotatably secured to said flexible member betwen said end portions, a first rigid tubular idler roller having a suspension end portion with a first resilient end wall fixed thereto and a shaft end portion with a second resilient end wall fixed thereto, a second rigid tubular idler roller having a suspension end portion with a third resilient end wall fixed thereto and a shaft end portion with a fourth resilient end wall fixed thereto, said flexible member first end portion non-rotatably secured to said first idler roller first resilient end wall, said flexible member second end portion non-rotatably secured to said second idler roller third resilient end wall, a first stub shaft non-rotatably secured to said first idler roller second resilient end wall, a second stub shaft non-rotat- ably secured to said second idler roller fourth resilient end wall, idler roller support means, first bearing means rotatably receiving said first stub shaft, said first bearing means positioned in and supported by said support means, second bearing means rotatably receiving said second stub shaft, said second bearing means positioned in and supported by said support means in spaced relation to said first bearing means, said first and second idler rollers and said belt contacting member resiliently supporting a conveyor belt troughed conveying reach having parallel edge portions, said troughed conveying reach trough adapted to vary in depth under varying conditions of belt loading, said flexible member and said first and second idler rollers so constructed and arranged that said conveying reach edge portions remain in contact with said first and second rigid tubular idler rollers under all conditions of belt loading.

3. A conveyor belt troughing idler roller assembly comprising an elongated, flexible member having first and second end portions and a resilient sheath of annular cross section non-rotatably secured to said flexible member and surrounding said flexible member intermediate said end portions, said sheath having an irregular external surface whereby said sheath external surface forms a plurality of belt contacting portions having a fixed external diameter and a plurality of spacer portions having diameters less than said belt contacting portion diameters, said spacer portions being formed between said belt contacting portions, a first rigid tubular idler roller having a suspension end portion and a shaft end portion, a second rigid tubular idler roller having a suspension end portion and a shaft end portion, first resilient connecting means non-rotatably connecting said first idler roller suspension end portion to said flexible member first end portion, second resilient connecting means non-rotatably connecting said second idler suspension end portion to said flexible member second end portion, a first stub shaft, third resilient connecting means non-rotatably connecting said first stub shaft to said first idler roller shaft end portion, a second stub shaft, fourth resilient connecting means non-rotatably connecting said second stub shaft to said second idler roller shaft end portion, idler roller support means, first bearing means rotatably receiving said first stub shaft and universally supported by said support means, second bearing means rotatably receiving said second stub shaft and universally supported by said support means in spaced relation to said first bearing means, said first and second idler rollers and said sheath belt contacting portions resiliently supporting a conveyor belt troughed conveying reaching having parallel edge portions, said troughed conveying reach adapted to vary in depth under varying conditions of belt loading, said flexible member and said first and second idler rollers so constructed and arranged that said conveying reach edge portions remain in contact with said first and second rigid tubular idler rollers under all conditions of belt loading.

4. A conveyor belt troughing idler roller assembly comprising an elongated, flexible member having first and second end portions and a plurality of axially spaced belt contacting portions non-rotatably secured to said flexible member between said end portions, a first rigid tubular idler roller having a suspension end portion and a shaft end portion, a second rigid tubular idler roller having a suspension end portion and a shaft end portion, first resilient connecting means non-rotatably connecting said first idler roller suspension end portion to said flexible member first end portion, second resilient connecting means non-rotatably connecting said second idler suspension end portion to said flexible member second end portion, a first stub shaft, third resilient connecting means non-rotatably connecting said first stub shaft to said first idler roller shaft end portion, a second stub shaft, fourth resilient connecting means non-rotatably connecting said second stub shaft to said second idler roller shaft end portion, idler roller support means, first bearing means rotatably receiving said first stub shaft and universally supported by said support means, second bearing means rotatably receiving said second stub shaft and universally supported by said support means in spaced relation to said first bearing means, said first and second idler rollers and said belt contacting portions resiliently supporting a conveyor belt troughed conveying reach having parallel edge portions, said troughed conveying reach trough adapted to vary in depth under varying conditions of belt loading, said flexible member and said first and second idler rollers so constructed and arranged that said conveying reach edge portions remain in contact with said first and second tubular idler rollers under all conditions of belt loading.

5. A conveyor belt troughing idler roller assembly comprising an elongated, flexible member having first and second end portions and a plurality of axially spaced belt contacting portions non-rotatably secured to said flexible member between said end portions, a first rigid tubular idler roller having a suspension end portion and a shaft end portion, a second rigid tubular idler roller having a suspension end portion and a shaft end portion, first resilient connecting means non-rotatably connecting said first idler roller suspension end portion to said flexible member first end portion, second resilient connecting means non-rotatably connecting said second idler suspension end portion to said flexible member second end portion, a first stub shaft, third resilient connecting means non-rotatably connecting said first stub shaft to said first idler roller shaft end portion, a second stub shaft, fourth resilient connecting means non-rotatably connecting said second stub shaft to said second idler roller shaft end portion, idler roller support means, first bearing means rotatably receiving said first stub shaft and universally supported by said support means, second bearing means rotatably receiving said second stub shaft and universally supported by said support means in spaced relation to said first bearing means, said first and second idler rollers and said belt contacting portions resiliently supporting a conveyor belt troughed conveying reach, said resilient connecting means resiliently insulating said belt supporting portions of said idler roller assembly from said stub shafts whereby said first and second bearing means are protected from shock loads imposed upon said roller assembly by material striking said belt conveying reach.

6. A conveyor belt troughing idler roller assembly comprising an elongated, flexible member having first and second end portions and a plurality of axially spaced belt contacting portions non-rotatably secured to said flexible member between said end portions, a first rigid tubular idler roller having a suspension end portion and a shaft end portion, a second rigid tubular idler roller having a suspension end portion and a shaft end portion, first resilient connecting means non-rotatably connecting said first idler roller suspension end portion to said flexible member first end portion, second resilient connecting means non-rotatably connecting said second idler suspension end portion to said flexible member second end portion, a first stub shaft, third resilient connecting means non-rotatably connecting said first stub shaft to said first idler roller shaft end portion, a second stub shaft, fourth resilient connecting means non-rotatably connecting said second stub shaft to said second idler roller shaft end portion, idler roller support means, first bearing means rotatably receiving said first stub shaft and universally supported by said support means, second bearing means rotatably receiving said second stub shaft and universally supported by said support means in spaced relation to said first bearing means, said first and second idler rollers and said belt contacting portions resiliently supporting a conveyor belt troughed conveying reach, said resilient connecting means adapted to permit elongation of said roller assembly between said first and second bearing means under heavy loading conditions on said belt conveying reach to prevent breaking of said roller assembly by excessive conveying reach loads.

References Cited in the file of this patent
UNITED STATES PATENTS

| | | |
|---|---|---|
| 2,820,541 | Barnish | Jan. 21, 1958 |
| 2,876,890 | Baechli | Mar. 10, 1959 |